(12) United States Patent
Keller

(10) Patent No.: US 10,400,962 B2
(45) Date of Patent: Sep. 3, 2019

(54) LIGHTING DEVICE

(71) Applicant: CHERVON (HK) LIMITED, Wanchai (HK)

(72) Inventor: Guillaume Keller, Nanjing (CN)

(73) Assignee: CHERVON (HK) LIMITED, Wanchai (HK)

( * ) Notice: Subject to any disclaimer, the term of this patent is extended or adjusted under 35 U.S.C. 154(b) by 275 days.

(21) Appl. No.: 15/342,215

(22) Filed: Nov. 3, 2016

(65) Prior Publication Data

US 2017/0130912 A1   May 11, 2017

(51) Int. Cl.
| | |
|---|---|
| *F21L 4/00* | (2006.01) |
| *B25B 23/18* | (2006.01) |
| *B25F 5/00* | (2006.01) |
| *F21V 5/00* | (2018.01) |
| *F21V 7/00* | (2006.01) |
| *F21V 23/04* | (2006.01) |
| *F21L 4/04* | (2006.01) |
| *F21V 8/00* | (2006.01) |
| *F21V 21/14* | (2006.01) |
| *F21V 23/06* | (2006.01) |
| *F21V 33/00* | (2006.01) |
| *F21V 21/08* | (2006.01) |
| *F21Y 105/00* | (2016.01) |
| *H04R 1/02* | (2006.01) |

(52) U.S. Cl.
CPC ............ *F21L 4/00* (2013.01); *B25B 23/18* (2013.01); *B25F 5/00* (2013.01); *F21L 4/04* (2013.01); *F21V 5/006* (2013.01); *F21V 7/0025* (2013.01); *F21V 7/0075* (2013.01); *F21V 23/0414* (2013.01); *G02B 6/0001* (2013.01); *G02B 6/0036* (2013.01); *F21V 21/0832* (2013.01); *F21V 21/145* (2013.01); *F21V 23/0407* (2013.01); *F21V 23/06* (2013.01); *F21V 33/0052* (2013.01); *F21V 33/0084* (2013.01); *F21Y 2105/00* (2013.01); *H04R 1/028* (2013.01); *H04R 2201/028* (2013.01)

(58) Field of Classification Search
CPC ...... F21V 5/006; F21V 7/0025; F21V 7/0075; F21V 23/0414; F21V 21/0832; F21V 21/145; F21V 23/0407; F21V 23/06; F21V 33/052; F21V 33/0084; G02B 6/0001; G02B 6/0036; F21Y 2105/00; H04R 1/028
USPC ............................................................ 362/157
See application file for complete search history.

(56) References Cited

U.S. PATENT DOCUMENTS

| | | | |
|---|---|---|---|
| 6,502,949 B1 * | 1/2003 | Horiyama | B23Q 11/0046 173/217 |
| 7,185,998 B2 * | 3/2007 | Oomori | B25B 23/18 362/119 |

* cited by examiner

*Primary Examiner* — Anh T Mai
*Assistant Examiner* — Jessica M Apenteng
(74) *Attorney, Agent, or Firm* — Greenberg Traurig, LLP

(57) ABSTRACT

A lighting device has a device body including an output terminal for outputting electric energy and a split-type light including at least a lighting element. The device body includes a coupling portion for detachably connecting the split-type light with the device body. The split-type light includes a built-in power supply for supplying electric energy to the lighting element and an input terminal for inputting electric energy to the split-type light. When the split-type light is connected with the device body, the output terminal is electrically connected with the input terminal.

19 Claims, 17 Drawing Sheets

US 10,400,962 B2

LIGHTING DEVICE

RELATED APPLICATION INFORMATION

This application claims the benefit under 35 U.S.C. § 119(a) of Chinese Patent Application No. CN 201510755891.6, filed on Nov. 9, 2015, the disclosure of which is incorporated herein by reference in its entirety.

FIELD OF THE DISCLOSURE

The present disclosure relates generally to a lighting device.

BACKGROUND OF THE DISCLOSURE

While lighting devices generally exist, currently known lighting devices have less functions which cannot satisfy the requirements of a user.

The statements in this section merely provide background information related to the present disclosure and may not constitute prior art.

SUMMARY

In one aspect of the disclosure, a lighting device includes a device body including an output terminal for outputting electric energy and a split-type light including at least a lighting element. The device body includes a coupling portion for detachably connecting the split-type light with the device body. The split-type light includes a built-in power supply for supplying electric energy to the lighting element and an input terminal for inputting electric energy to the split-type light. When the split-type light is connected with the device body, the output terminal is electrically connected with the input terminal.

Further areas of applicability will become apparent from the description provided herein. It should be understood that the description and specific examples are intended for purposes of illustration only and are not intended to limit the scope of the present disclosure.

Figure 1:
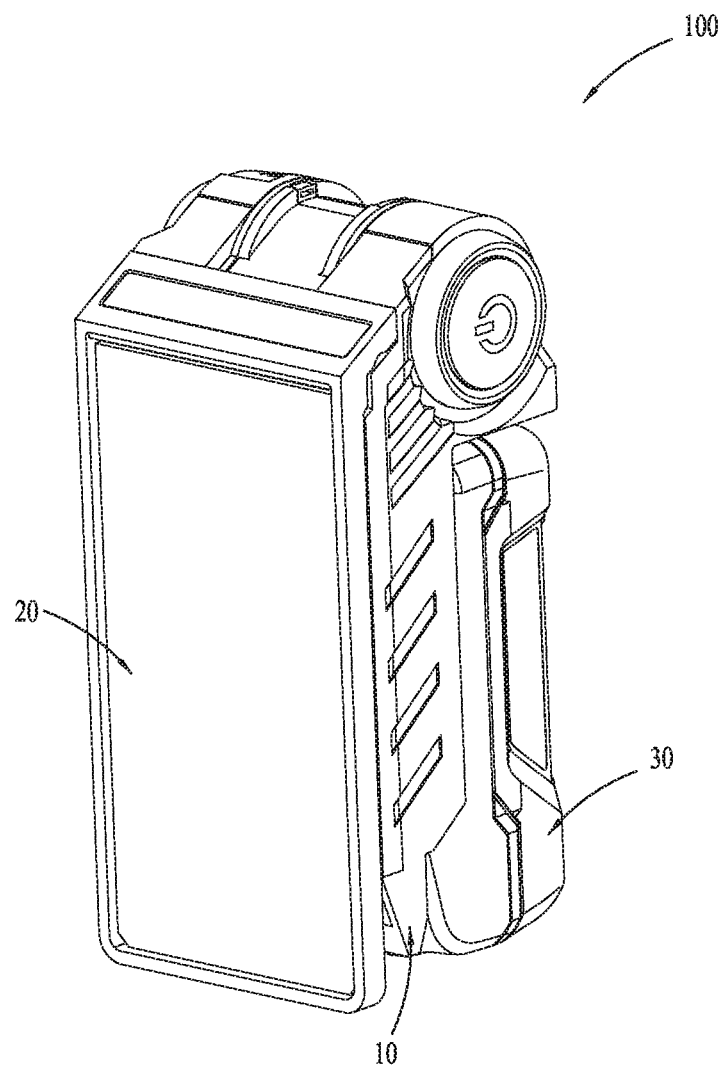
FIG. 1 is a schematic view of an exemplary lighting device.

The drawings described herein are for illustrative purposes only of selected implementations and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the invention hereinafter claimed, its application, or uses.

Figure 2:
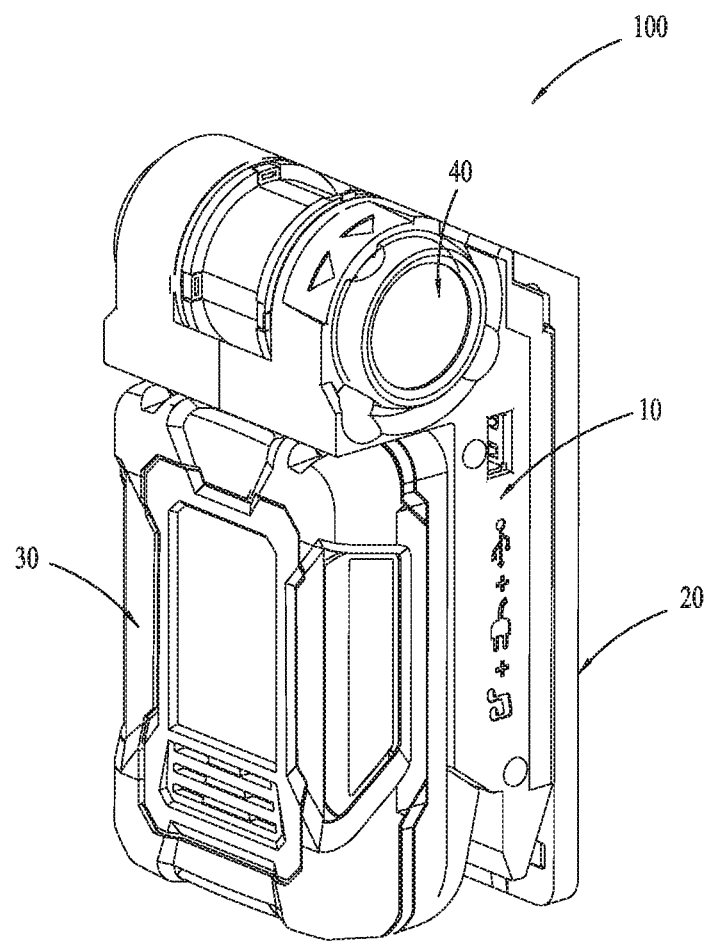
FIG. 2 a schematic view of a floodlight in FIG. 1, wherein the floodlight is in a first position.

Referring to FIGS. 1-2, a lighting device 100 includes a device body 10, a floodlight 20, a battery pack 30 and a split-type light 40.

The device body 10 is configured to assemble all the parts of the lighting device 100 into a whole. The device body 10 includes a circuit through which the battery pack 30 supplies electric energy to the floodlight 20 and the split-type light 40.

Figure 3:
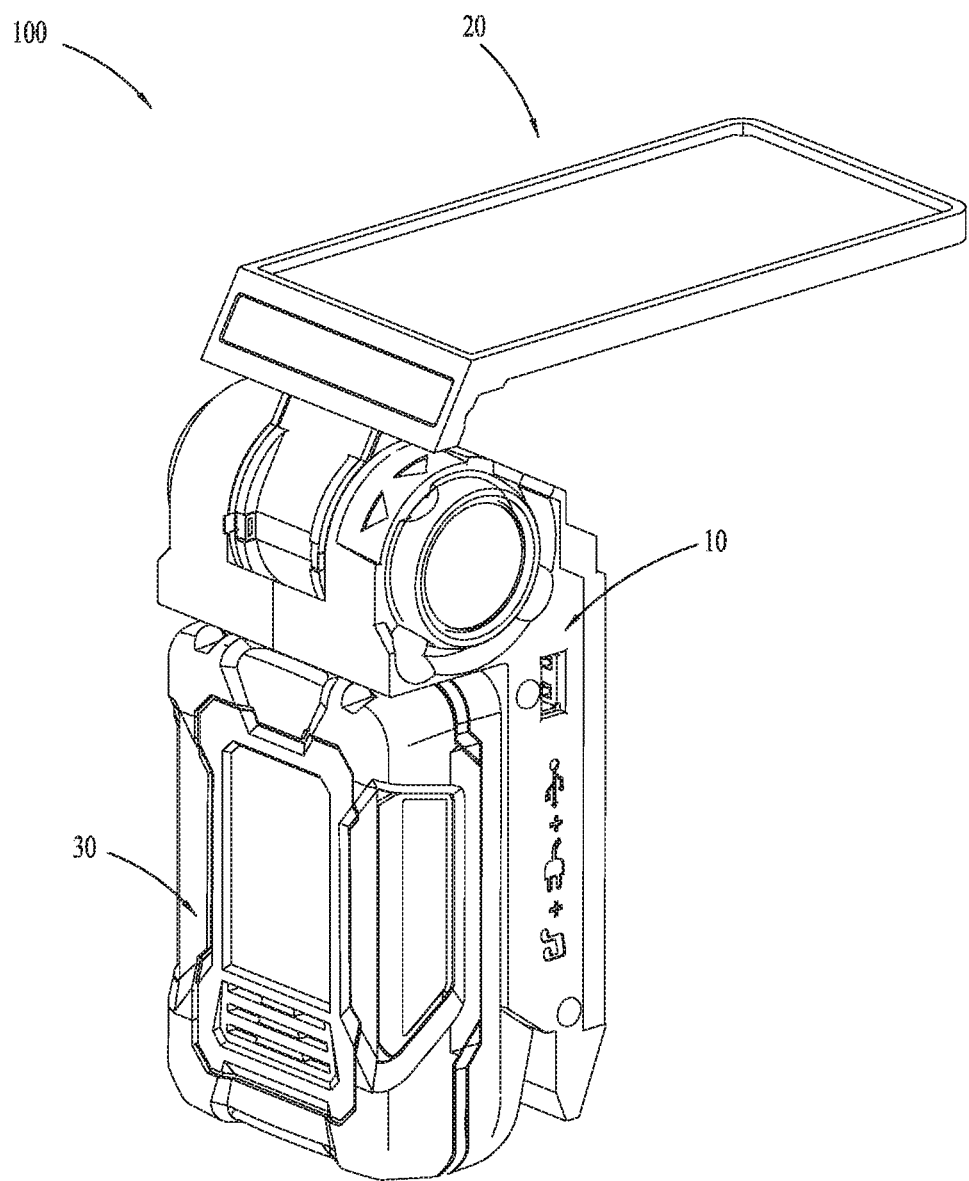
FIG. 3 is a schematic view of the floodlight in FIG. 1, wherein the floodlight is in a second position.
Figure 4:
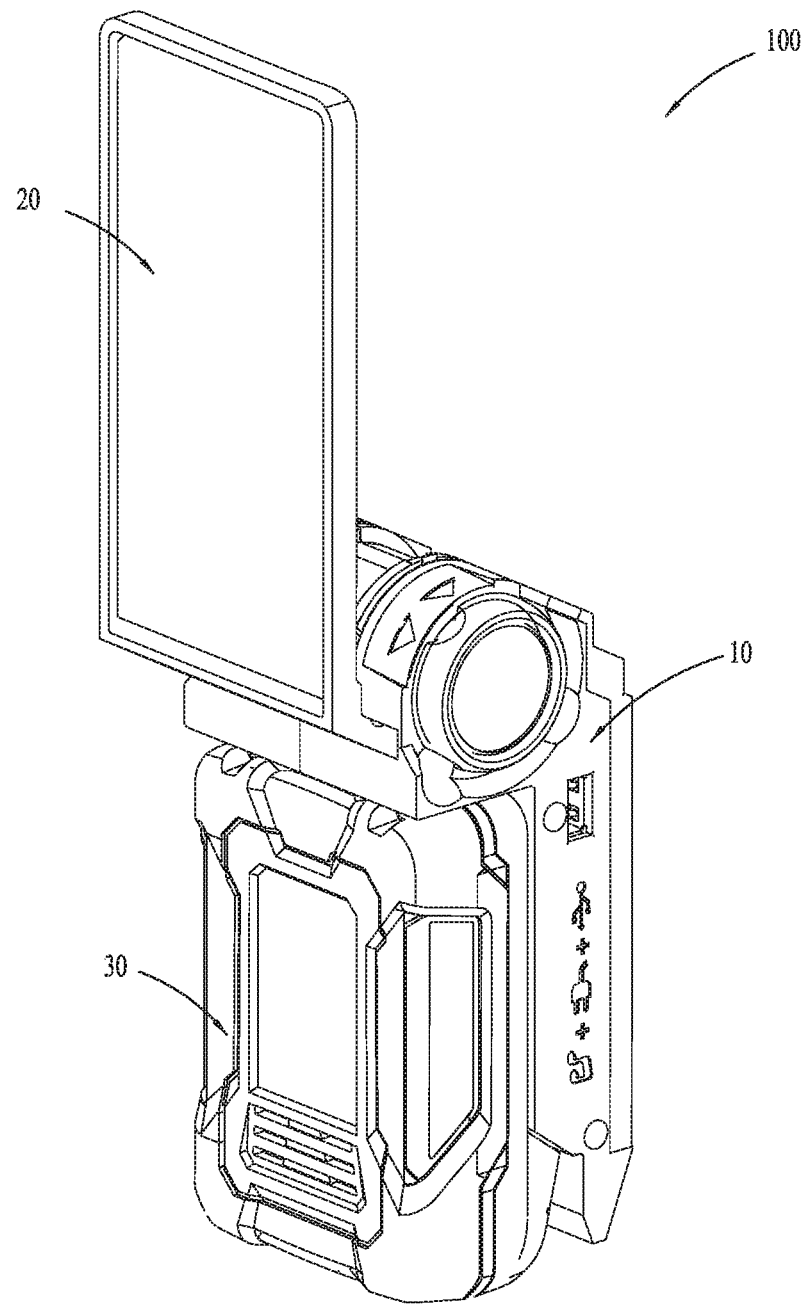
FIG. 4 is a schematic view of the floodlight in FIG. 1, wherein the floodlight is in a third position.

The floodlight 20 is capable of generating an area light. Referring to FIGS. 2-4, the floodlight 20 is connected rotatably with the device body 10

As shown in FIG. 2, in a first position, the floodlight 20 and the battery pack 30 are respectively located on two sides of the device body 10. Here, the position where the floodlight 20 is located is defined as a front side, and the position where the battery pack 30 is located is defined as a back side. The lighting device 100 can be put on a plane as shown in FIG. 2. At this moment, the floodlight 20 irradiates forward. As shown in FIG. 3, in a second position, the floodlight 20 turns 90 degrees relative to the first position and irradiates upward. As shown in FIG. 4, in a third position, the floodlight 20 turns 180 degrees relative to the first position and irradiates backward. The floodlight 20 can be adjusted to different positions relative to the device body 10, so that it can satisfy the requirements of a user in different working conditions. In other embodiment, the floodlight 20 can be rotated around several different rotation axes, so that it can irradiate toward different directions.

Figure 5:
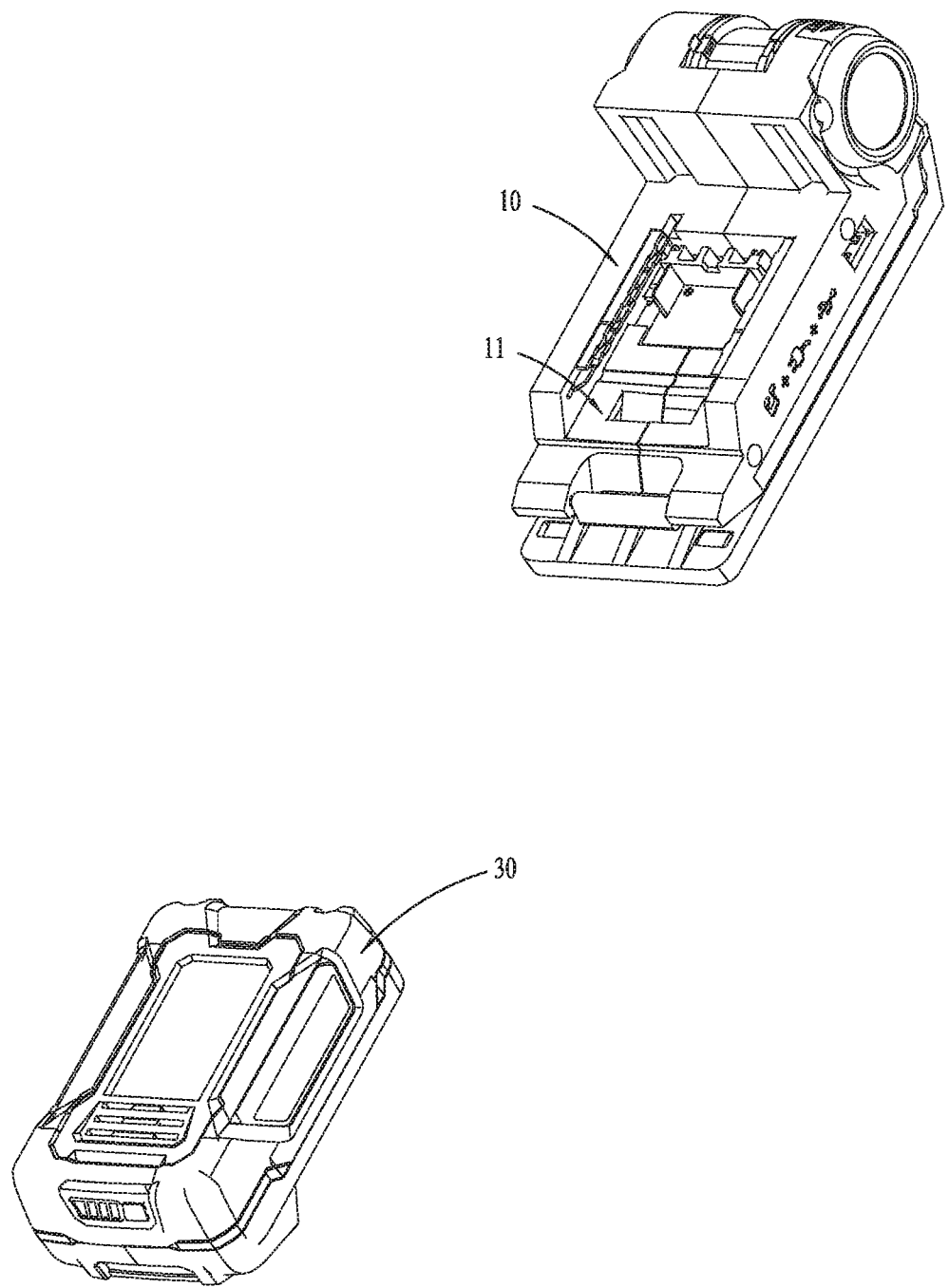
FIG. 5 is a schematic view showing the mounting method of a battery pack in FIG. 1.
Figure 6:
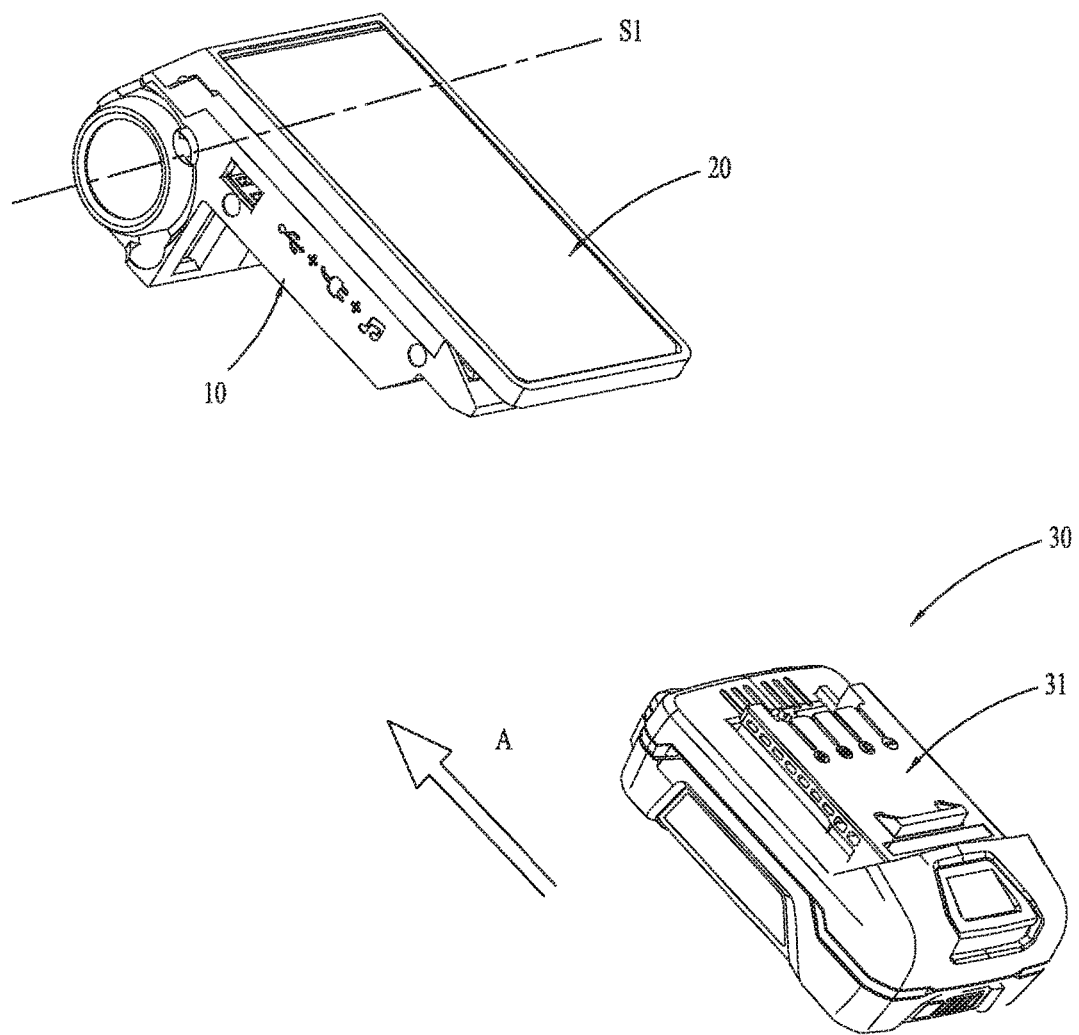
FIG. 6 is another schematic view showing the mounting method of the battery pack in FIG. 1.

Referring to FIGS. 5-6, the battery pack 30 is detachably connected with the device body 10. The device body 10 includes a mounting portion 11. The battery pack 30 includes an engaging portion 31 for engaging with the mounting portion 11. When the battery pack 30 is connected with the device body 10, they are connected electrically. As shown in FIG. 6, an axis 51, around which the floodlight 20 is rotated relative to the device body 10, is substantially perpendicular to a first coupling direction A of the battery pack 30.

Figure 7:
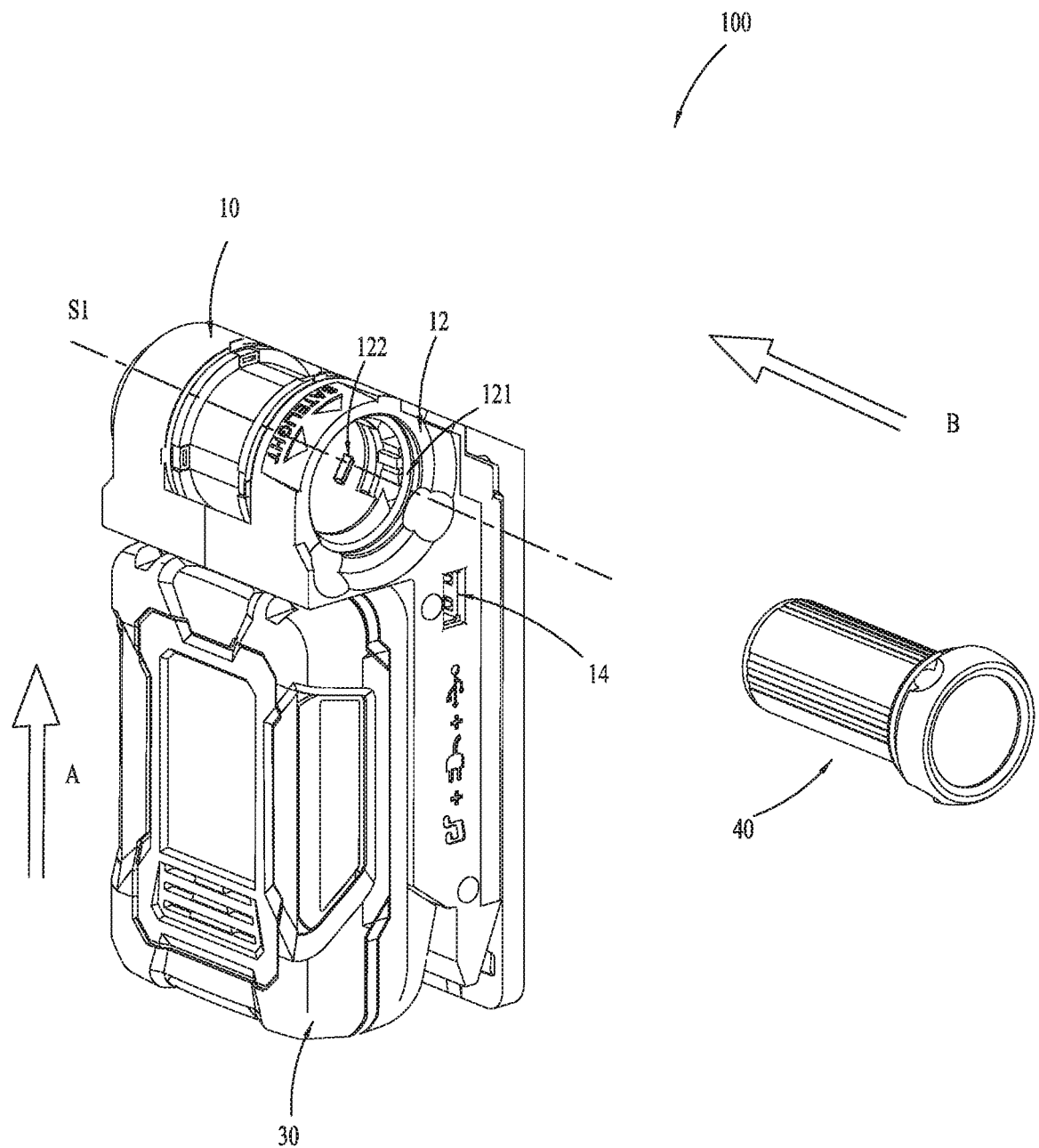
FIG. 7 is a schematic view showing the mounting method of a split-type light in FIG. 1.
Figure 8:
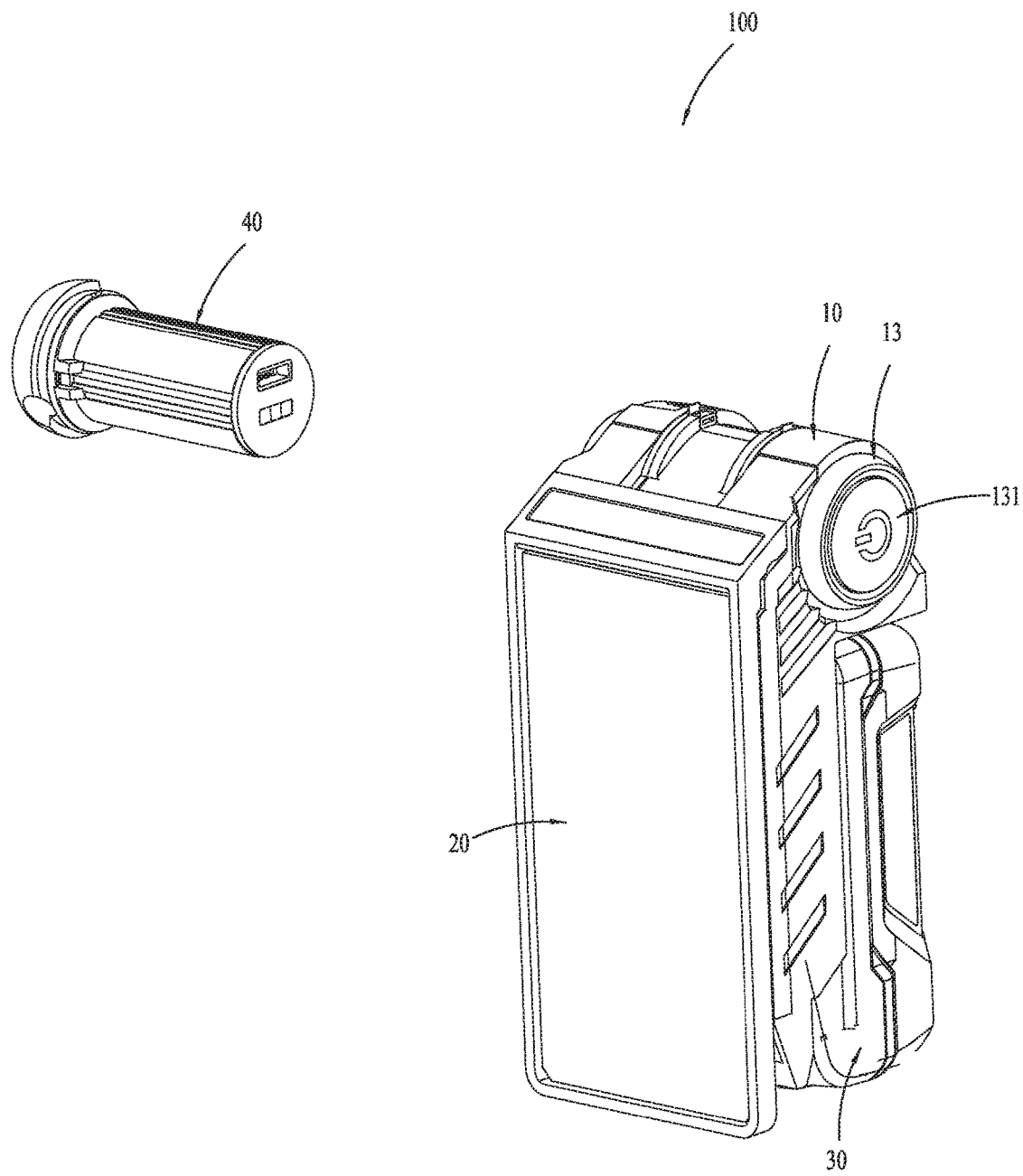
FIG. 8 is another schematic view showing the mounting method of the split-type light in FIG. 1.

Referring to FIGS. 7-8, the split-type light 40 is detachably connected with the device body 10. Specifically, the device body 10 includes a coupling portion 12, and the split-type light 40 is detachably connected with the coupling portion 12. The coupling portion 12 includes an inserting slot 121 for accommodating the split-type light 40. Here, the word 'accommodate' means that the split-type light 40 is at least partially accommodated in the inserting slot 121.

As shown in FIG. 7, the axis 51 is substantially parallel to a second coupling direction B of the split-type light 40. The second coupling direction B of the split-type light 40 is substantially perpendicular to the first coupling direction A of the battery pack 30.

Referring to FIGS. 7-8, the device body 10 includes a control portion 13. The control portion 13 includes at least a control switch 131. When the split-type light 40 is connected with the device body 10, the control switch 131 is operable to control the split-type light 40. The control switch 131 and an opening of the inserting slot 121 are respectively arranged on two opposite sides of the device body 10. The side where the control switch 131 is located is defined as a left side of the device body 10. The split-type light 40 is connected with the device body 10 from a right side.

Specifically, the control switch 131 is also operable to control the floodlight 20. Further, the control switch 131 is operable to control the split-type light 40 and the floodlight 20 at the same time. Under the control of the control switch 131, the lighting device 100 includes multi modes. In a first mode, the floodlight 20 is on, and the split-type light 40 is not on. In a second mode, the floodlight 20 is not on, and the split-type light 40 is on. In a third mode, the split-type light 40 and the floodlight 20 are on at the same time. Otherwise, the split-type light 40 and the floodlight 20 have adjustable brightness which includes at least a first brightness and a second brightness. The first brightness is greater than the second brightness. The lighting device 100 further has a flashing function. The split-type light 40 and the floodlight 20 can flash at the same time or respectively, i.e., at different times. Switching between the different functions and modes can be realized through a pressing of the control switch 131. When the control switch 131 is pressed for more than a predetermined period of time, the lighting device 100 is power off.

As shown in FIG. 7, the device body 10 includes a body connector 14 for outputting electric energy. The body connector 14 is electrically connected with the circuit in the device body 10. The body connector 14 outputs electric energy so that the lighting device 100 can act as a portable power source for supplying electric energy to other electrical devices. In the illustrated example, the body connector 14 comprises a USB (universal serial bus) port connector. Other connectors are, however, comtemplated.

Furthermore, the body connector 14 can be used to output data. The device body 10 includes a data storage unit for storing data. The body connector 14 is connected with the data storage unit so as to output data. However, the data storage unit may be an external unit, for example, a memory card. The memory card can be inserted into the device body 10 for storing data.

Figure 9:
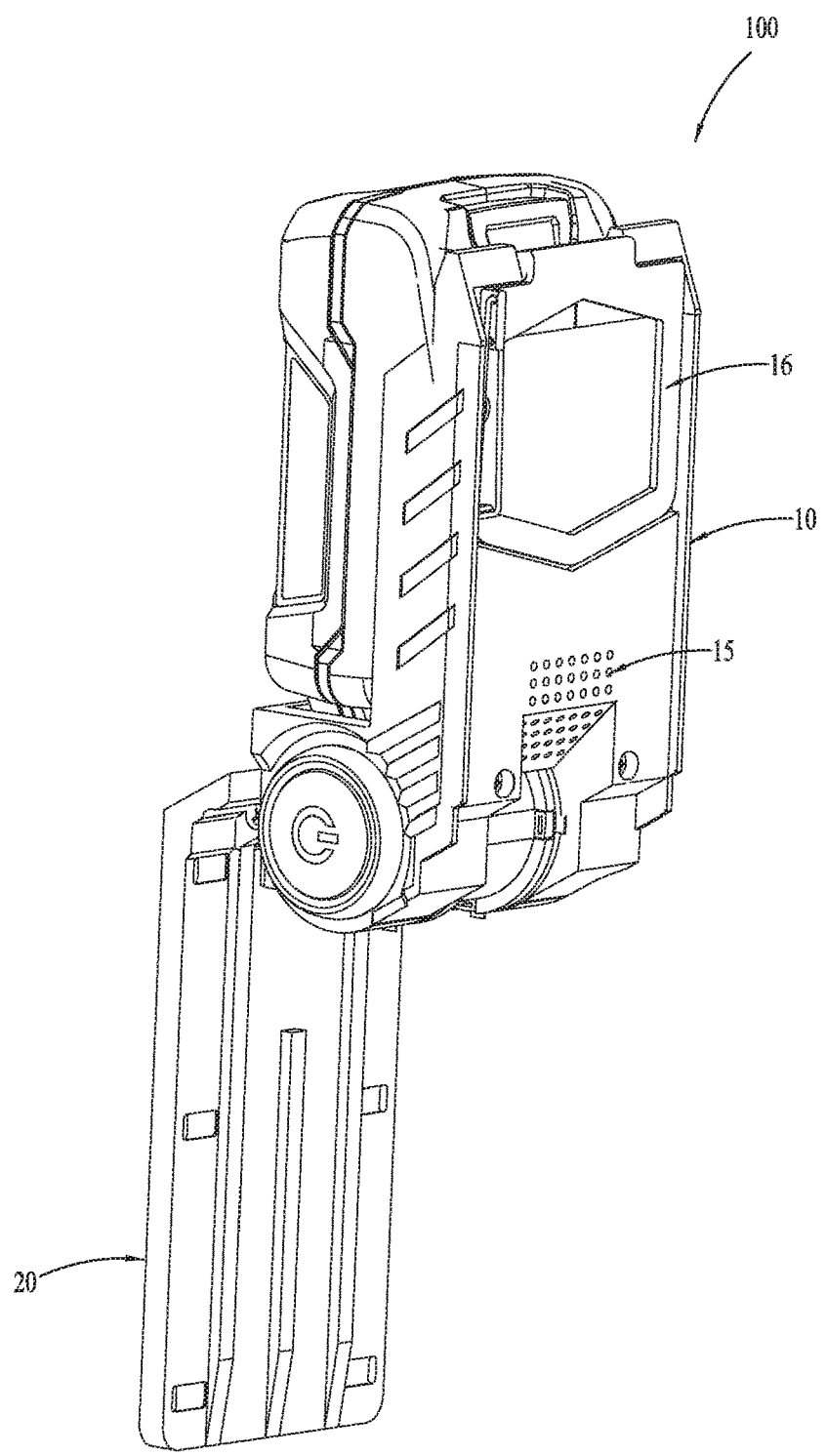
FIG. 9 is a schematic view of a hook in FIG. 1, wherein the hook is in storage position.

As shown in FIG. 9, the device body 10 includes a speaker 15 for outputting sound. When the battery pack 30 runs low, the speaker 15 can emit a warning tone to remind the user to charge the battery pack 30. When the lighting device 100 fails, the user can distinguish the failure part according to different warning tones. The speaker 15 also can act as a stereo. When an external audio signal is input into the device body 10, it can be sent out through the speaker 15 so as to realize an effect of a power amplifier.

Figure 10:
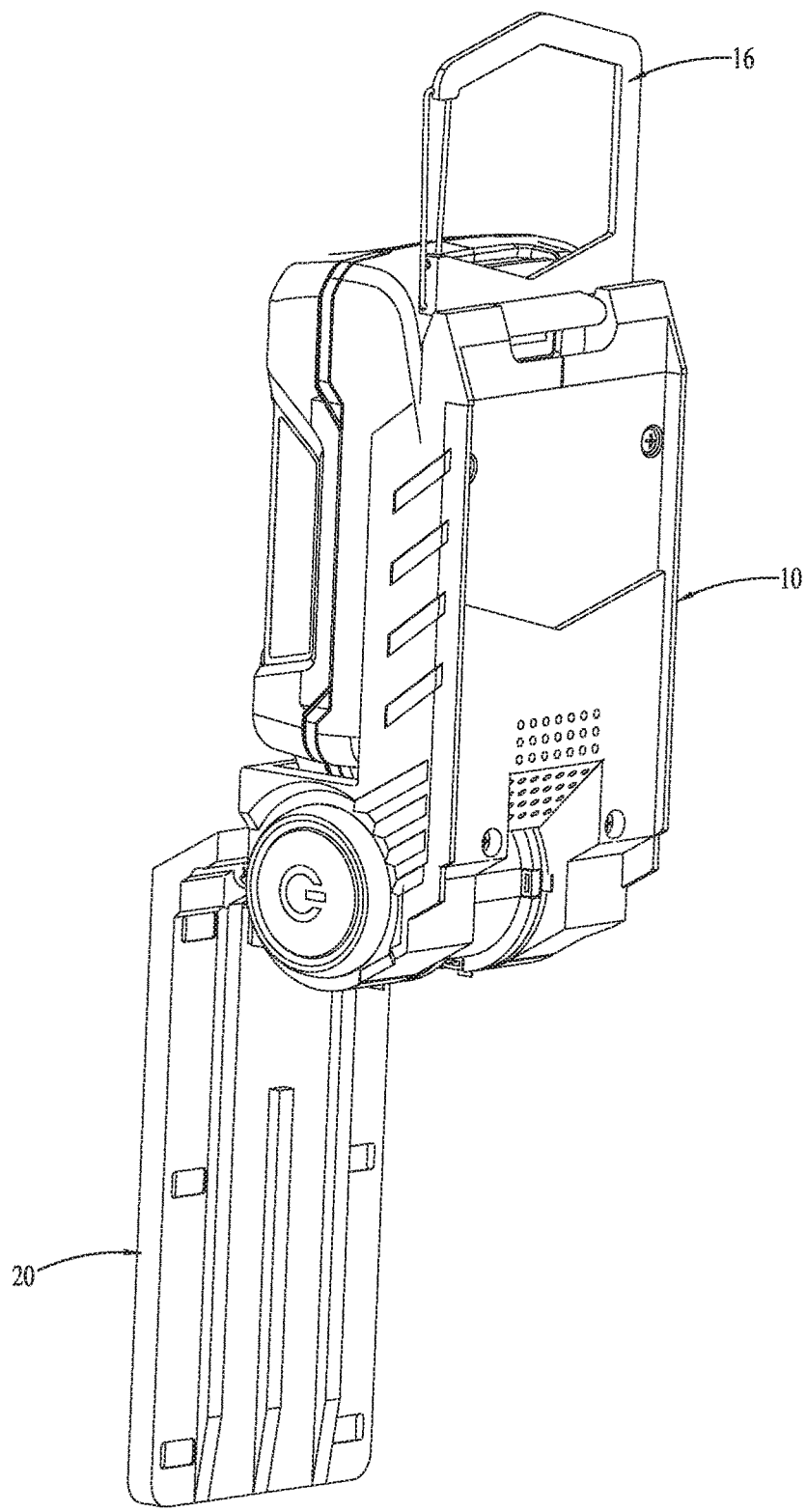
FIG. 10 is a schematic view of the hook in FIG. 1, wherein the hook is in a working position.
Figure 11:
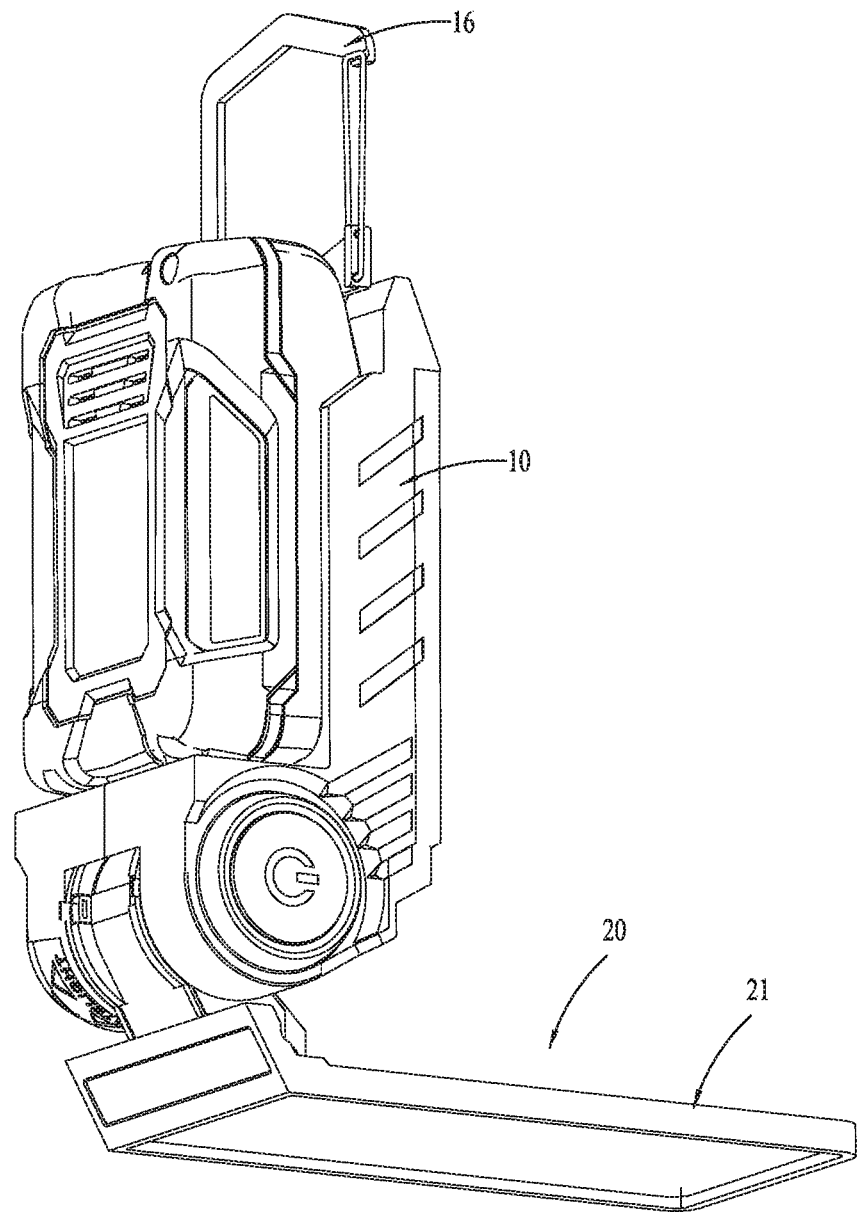
FIG. 11 is another schematic view of the hook in FIG. 1, wherein the hook is in the working position.

Referring to FIGS. 9-11, the lighting device 100 includes a hook 16 rotatably connected with the device body 10. The hook 16 has a storage position and a working position relative to the device body 10. As shown in FIG. 9, the hook 16 is in the storage position. As shown in FIGS. 10 and 11, the hook 16 is in the working position. The user can hang the lighting device 100 through the hook 16 so as to facilitate the performance of work being performed.

Figure 12:
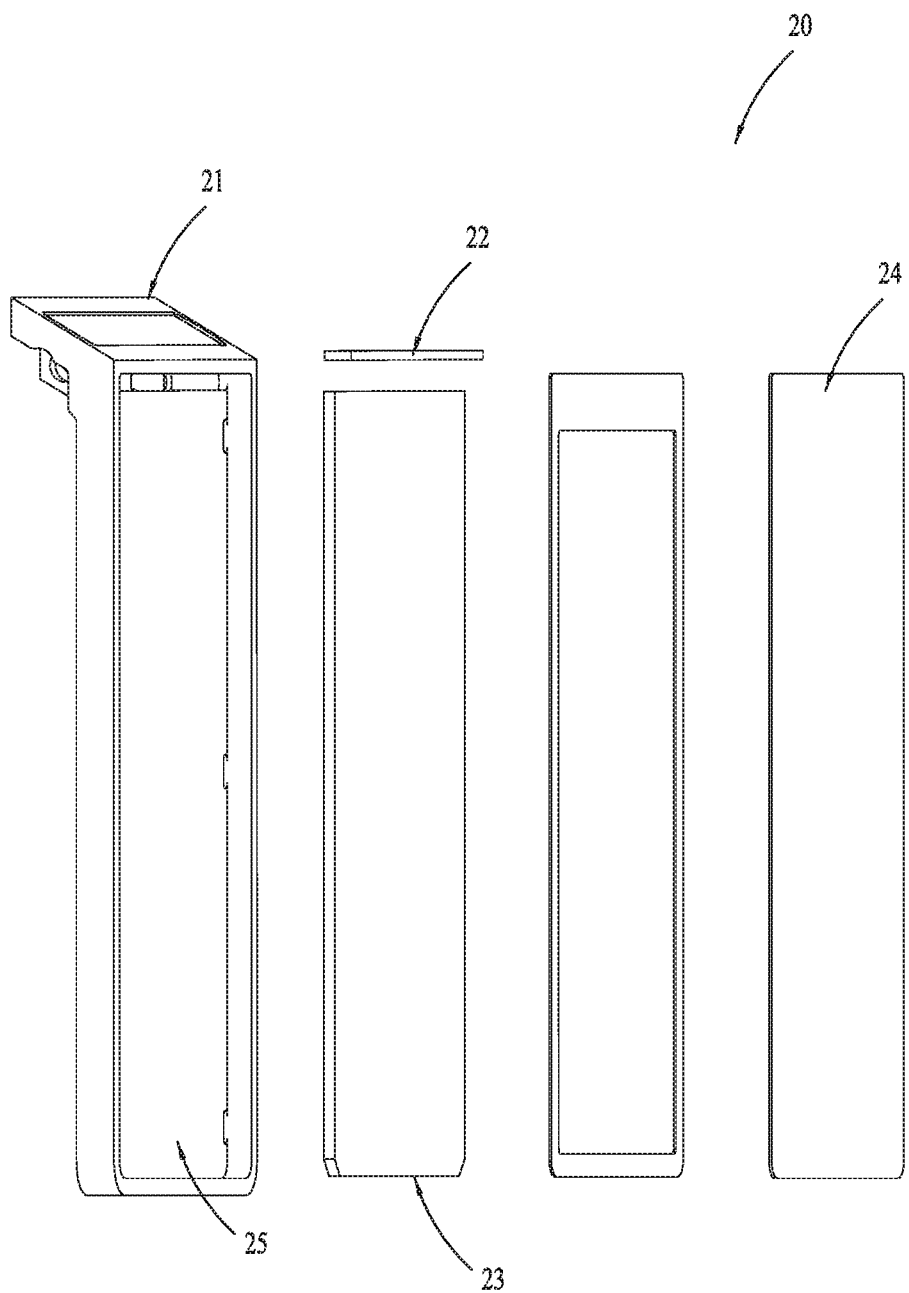
FIG. 12 is an exploded view of the floodlight in FIG. 1.
Figure 13:
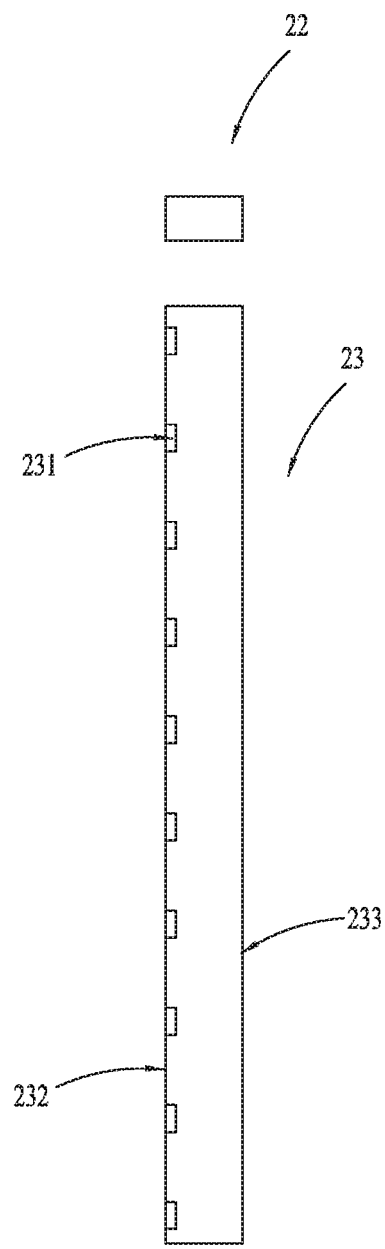
FIG. 13 is a schematic view of a light-emitting element in FIG. 12.
Figure 14:
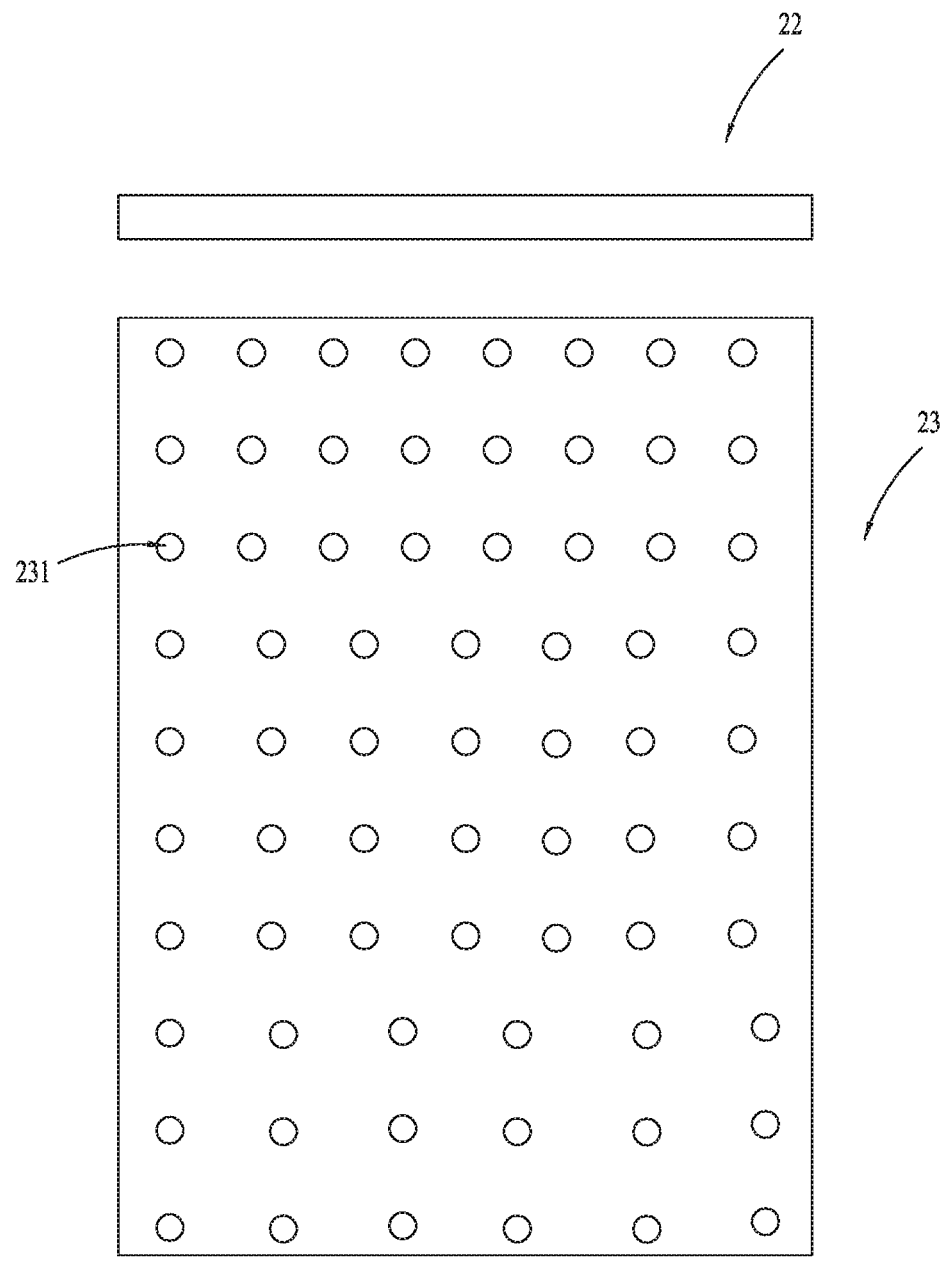
FIG. 14 is a schematic view of a light guiding element in FIG. 12.
Figure 15:
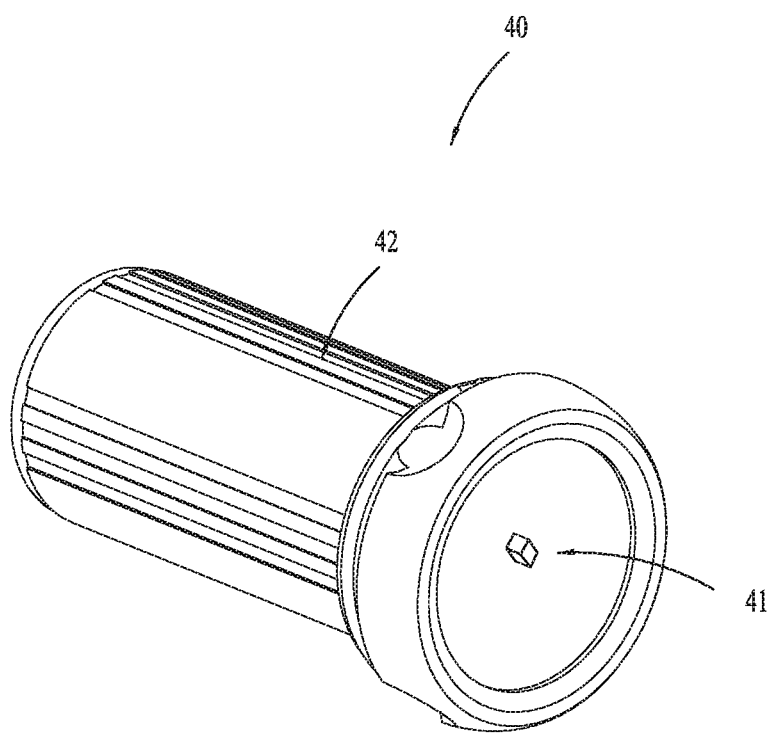
FIG. 15 is a schematic view of the split-type light in FIG. 1.
Figure 16:
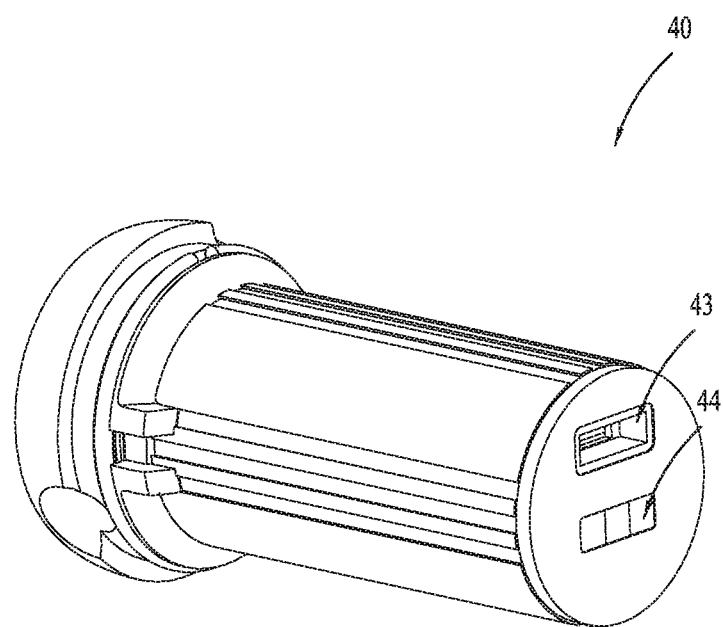
FIG. 16 is another schematic view of the split-type light in FIG. 1 from another perspective.

Referring to FIGS. 11-12, the floodlight 20 includes a shell 21, a light-emitting element 22 and a light guiding element 23.

The shell 21 is configured to contain and fix the light guiding element 23, which is rotatably connected with the device body 10 so as to adjust the irradiation angle of the floodlight 20. Specifically, the shell 21 is made of metal material, and in particular, aluminum material. The light-emitting element 22 is capable of projecting light. The light guiding element 23 is capable of changing the direction of the light of the light-emitting element 22 so as to form the area light. The light guiding element 23, which is made of transparent material, includes a plurality of reflecting units 231 for changing the direction of the light of the light-emitting element 22. So the light of the light-emitting element 22 projects along an outer surface of the light guiding element 23. The light guiding element 23 includes a first surface 232 and a second surface 233 which are arranged oppositely. At least a part of the light of the light-emitting element 22 projects to the light guiding element 23 from a space between the first and second surfaces 232, 233, and then projects out from the outer surface of the light guiding element 23.

The first and second surfaces 232, 233 can be curved surfaces or flat surfaces. Specifically, the light guiding element 23 is a plate, and the first and second surfaces 232, 233 are two flat surfaces of the plate which are parallel to each other.

The reflecting units 231 can be arranged on the first or second surface 232, 233, or on both the first and second surfaces 232, 233. Specifically, the reflecting units 231 are arranged on the first surface 232. The second surface 233 is a smooth surface. The reflecting units 231 can be projections protruding from the surface of the light guiding element 23 or recesses forming inward from the surface of the light guiding element 23. Specifically, the reflecting units 231 are recesses forming inward from the surface of the light guiding element 23. The reflecting units 231 have a density which reduces from one side close to the light-emitting element 22 to another side. The reflecting units 231 close to the light-emitting element 22 has a first maximum size which is greater than a second maximum size of the reflecting units 231 far from the light-emitting element 22. Further, the reflecting units 231 close to the light-emitting element 22 has a first depth which is greater than a second depth of the reflecting units 231 far from the light-emitting element 22.

The floodlight 20 includes a cover 24 and a reflector 25. The cover 24 covers a part of the outer surface of the light guiding element 23 from which the light projects, so that the light generated by the floodlight 20 is softer.

The reflector 25 is used to reflect the light on the remaining part of the outer surface of the light guiding element 23 from which the light does not project. So the light generated by the light-emitting element 22 is used effectively. In other embodiment, the shell 21 can be formed with a reflecting surface therein, and the shell 21 itself acts as the reflector 25.

Referring to FIGS. 7-8 and 15-16, the split-type light 40 includes at least a lighting element 41 for lighting. The split-type light 40 further includes a built-in power supply 42 and an input terminal 43. The built-in power supply 42 is used to supply electric energy to the lighting element 41, which consists of three batteries. The device body 10 includes an output terminal 122 which can engage with the input terminal 43. When the split-type light 40 is connected with the device body 10 to form a whole, the input terminal 43 is electrically connected with the output terminal 122. The output terminal 122 is arranged in the inserting slot 121 of the coupling portion 12. The split-type light 40 includes a magnetic element 44 such as a magnet. The magnetic element 44 is capable of providing a force to fix the split-type light 40 on the device body 10. When the split-type light 40 is detached from the device body 10, it can work independently. When the split-type light 40 is connected with the device body 10, the battery pack 30 can charge the built-in power supply 42 and supply electric energy to the lighting element 41 directly.

Figure 17:
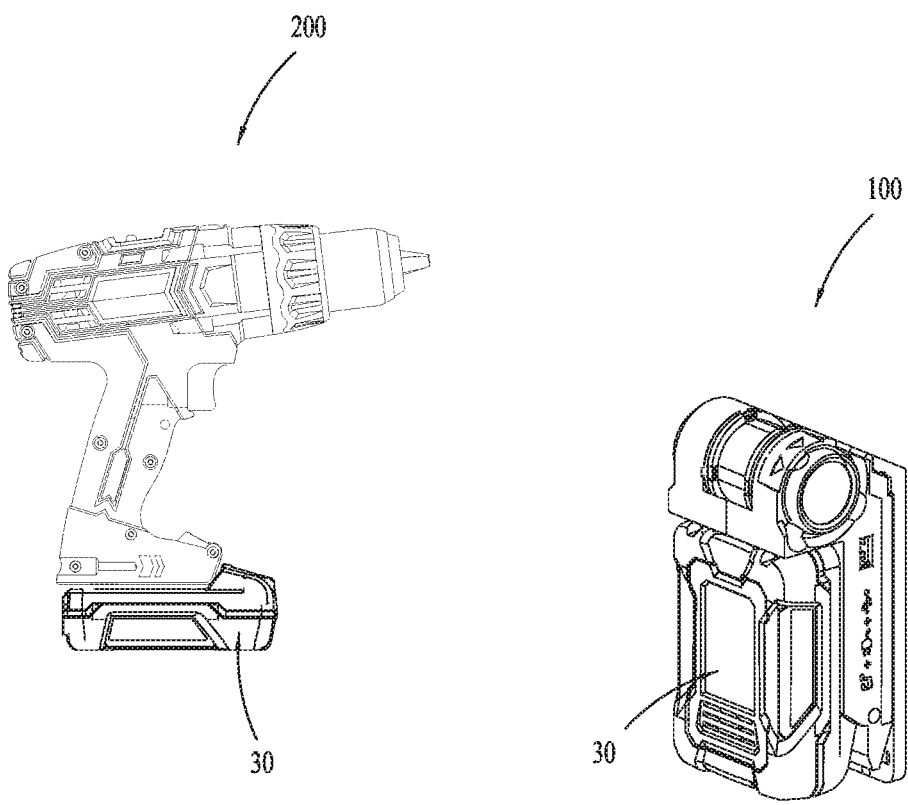
FIG. 17 is a schematic view of a combination of the lighting device in FIG. 1 and a power tool.

The lighting device 100 described above can be adapted to a power tool 200 so as to form a combination. As shown in FIG. 17, the battery pack 30 of the lighting device 100 can be mounted on the power tool 200 and supply electric energy to the power tool 200. However, the power tool 200 can be connected with the body connector 14 of the lighting device 100 through an external cable so that it can be powered by the electric energy of the lighting device 100. As an embodiment, the power tool 200 in FIG. 17 is an electric drill. But the power tool 200 is not limited to the electric drill shown and it is contemplated that the tool may be a sander, a circular saw, an electric wrench, a hedge trimmer, etc.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. A lighting device, comprising:
    a device body comprising an output terminal for outputting electric energy;
    a split-type light comprising at least a lighting element; and
    a floodlight rotatably connected with the device body and electrically coupled to the output terminal,
    wherein the device body comprises a coupling portion for detachably connecting the split-type light with the device body;
    wherein the split-type light comprises a built-in power supply for supplying electric energy to the lighting element and an input terminal for inputting electric energy to the split-type light;
    wherein, when the split-type light is connected with the device body, the output terminal is electrically connected with the input terminal.

2. The lighting device of claim 1, wherein the device body comprises a control portion and, the control portion comprises at least a control switch for controlling the split-type light when the split-type light is connected with the device body.

3. The lighting device of claim 2, wherein the coupling portion comprises an inserting slot for containing the split-type light and the output terminal is arranged within the inserting slot.

4. The lighting device of claim 3, wherein the control switch and an opening of the inserting slot are respectively arranged on two opposite sides of the device body.

5. The lighting device of claim 1, further comprising a battery pack which is detachably connected with the device body and wherein the device body comprises a circuit for supplying electric energy of the battery pack to the split-type light.

6. The lighting device of claim 1, wherein the device body comprises a body connector for outputting electric energy or data and, the body connector is electrically connected with a circuit in the device body.

7. The lighting device of claim 1, further comprising a battery pack detachably connected with the device body and wherein an axis around which the floodlight is rotated relative to the device body is substantially perpendicular to a coupling direction of the battery pack.

8. The lighting device of claim 1, wherein an axis around which the floodlight is rotated relative to the device body is substantially parallel to a coupling direction of the split-type light.

9. The lighting device of claim 1, wherein the floodlight is moveable to a position in which the floodlight and the battery pack are respectively located on opposed sides of the device body.

10. The lighting device of claim 1, wherein the floodlight comprises a light guiding element and a light-emitting element capable of projecting light, wherein the light of the light-emitting element projects out along an outer surface of the light guiding element, the light guiding element is provides with multi reflecting units for changing the direction of the light of the light-emitting element, and the light guiding element comprises a first surface and a second surface which are arranged oppositely such that the light of the light-emitting element at least partially projects into the light guiding element from a space between the first and second surfaces.

11. The lighting device of claim 10, wherein the light guiding element is made of transparent material.

12. The lighting device of claim 10, wherein the reflecting units are arranged on the first surface and, the second surface is a smooth surface.

13. The lighting device of claim 10, wherein the light guiding element is a plate and the first and second surfaces are two parallel plate surfaces of the plate.

14. The lighting device of claim 10, wherein the reflecting units are recesses formed inward from the outer surface of the light guiding element.

15. The lighting device of claim 10, wherein the reflecting units have a density which reduces from one side close to the light-emitting element to another side.

16. The lighting device of claim 10, wherein the floodlight comprises a cover for covering a part of the outer surface of the light guiding element from which the light projects out.

17. The lighting device of claim 10, wherein the floodlight comprises a reflector for reflecting the light on another part of the outer surface of the light guiding element from which the light does not project out.

18. The lighting device of claim 10, wherein the floodlight comprises a shell for containing the light guiding element and the shell is rotatably connected with the device body.

19. The lighting device of claim 18, further comprising a battery pack detachably connected with the device body and wherein the device body comprises a circuit for supplying electric energy of the battery pack to the floodlight.

* * * * *